United States Patent [19]

Bolasna et al.

[11] Patent Number: 5,650,893
[45] Date of Patent: Jul. 22, 1997

[54] ROLL INSENSITIVE AIR BEARING SLIDER

[75] Inventors: Sanford Anthony Bolasna; Devendra Singh Chhabra, both of San Jose; Sridhar Gopalakrishna, Sunnyvale, all of Calif.

[73] Assignee: International Business Machines Corporation, Armonk, N.Y.

[21] Appl. No.: 759,816

[22] Filed: Dec. 4, 1996

Related U.S. Application Data

[60] Continuation of Ser. No. 538,688, Oct. 3, 1995, abandoned, which is a division of Ser. No. 310,002, Sep. 20, 1994, abandoned, which is a continuation-in-part of Ser. No. 69,059, May 28, 1993, Pat. No. 5,396,386.

[51] Int. Cl.$^6$ .................................................. G11B 15/60
[52] U.S. Cl. ........................................................ 360/103
[58] Field of Search ........................................... 360/103

[56] References Cited

U.S. PATENT DOCUMENTS

| | | | |
|---|---|---|---|
| 3,678,482 | 7/1972 | Billawala | 340/174.1 E |
| 4,475,135 | 10/1984 | Warner et al. | 360/103 |
| 4,553,184 | 11/1985 | Ogishima | 360/103 |
| 4,555,739 | 11/1985 | Le Van et al. | 360/103 |
| 4,802,042 | 1/1989 | Strom | 360/103 |
| 4,870,519 | 9/1989 | White | 360/103 |
| 4,894,740 | 1/1990 | Chhabra et al. | 360/103 |
| 5,021,906 | 6/1991 | Chang et al. | 360/103 |
| 5,086,360 | 2/1992 | Smith et al. | 360/103 |
| 5,097,370 | 3/1992 | Hsia | 360/103 |
| 5,136,444 | 8/1992 | Maki et al. | 360/103 |
| 5,343,343 | 8/1994 | Chapin | 360/103 |
| 5,359,480 | 10/1994 | Nepela et al. | 360/103 |
| 5,396,386 | 3/1995 | Bolasna et al. | 360/103 |

FOREIGN PATENT DOCUMENTS

| | | |
|---|---|---|
| 071249 | 7/1982 | European Pat. Off. |
| 231625 | 12/1986 | European Pat. Off. |
| 372990 | 12/1989 | European Pat. Off. |
| 458445 | 3/1991 | European Pat. Off. |
| 466502 | 7/1991 | European Pat. Off. |
| 518566 | 6/1992 | European Pat. Off. |
| 543690 | 10/1992 | European Pat. Off. |
| 55-105858 | 8/1980 | Japan. |
| 60-109073 | 6/1985 | Japan. |
| 60-170084 | 9/1985 | Japan. |
| 63-224087 | 9/1988 | Japan. |

(List continued on next page.)

OTHER PUBLICATIONS

Anonymous, "Tri-Rail Negative Pressure Air Bearing Design", Research Disclosure, Sep. 1991, No. 329, Ref. No. 32971.

Anonymous, "Roll Insensitive Slider Design for Improved Disk File Reliability", Research Disclosure, Nov. 1985, No. 259, Ref. No. 25946.

*Primary Examiner*—Stuart S. Levy
*Assistant Examiner*—William J. Klimowicz
*Attorney, Agent, or Firm*—Ingrid M. Foerster

[57] ABSTRACT

An air bearing slider for use in carrying a transducer adjacent a recording medium exhibits reduced sensitivity to variations in roll, crown, and skew. In one embodiment, the slider comprises an air bearing slider having a pair of substantially coplanar side rails disposed along the sides of the air bearing surface so as to form a recessed section between the side rails. The recessed section is open at both the leading and trailing ends of the slider while each side rail has a tapered section or etched step at the leading edge of the slider. One rail carries the transducer and extends for the entire length of the slider body. The rail without a transducer extends from the leading edge toward the trailing edge, but does not extend all the way to the trailing edge. Under some skew, accessing, and crash stop impact conditions, the resulting slider roll causes the flying height of the inactive rail to drop. By proper selection of the length and width of the inactive rail, the roll is biased such that the fly height of the inactive rail remains higher than that of the active rail even under worst case conditions. Therefore, minimum slider to disk spacing is larger than it would be for a slider design in which all rails extend the entire length of the slider.

22 Claims, 13 Drawing Sheets

FOREIGN PATENT DOCUMENTS

| | | |
|---|---|---|
| 1-35720 | 2/1989 | Japan . |
| 1-116959 | 5/1989 | Japan . |
| 3-132981 | 6/1991 | Japan . |
| 4-117680 | 4/1992 | Japan . |
| 4-117681 | 4/1992 | Japan . |
| 4-117679 | 4/1992 | Japan . |
| 4-186573 | 7/1992 | Japan . |
| WO93/09533 | 5/1993 | WIPO . |

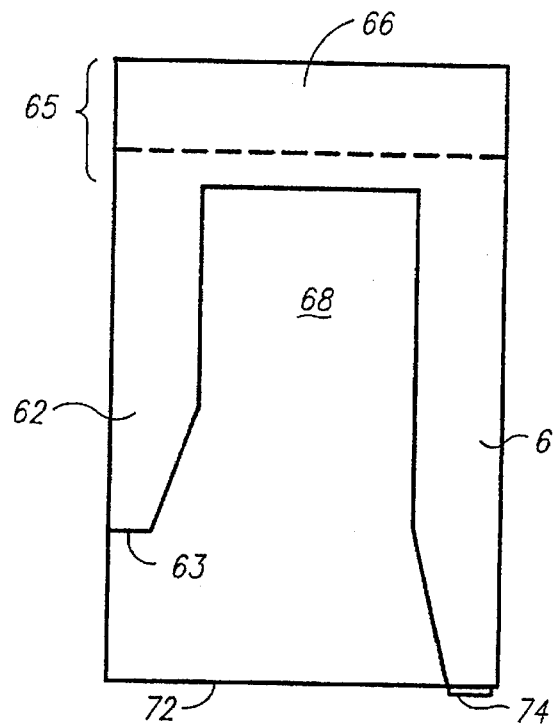
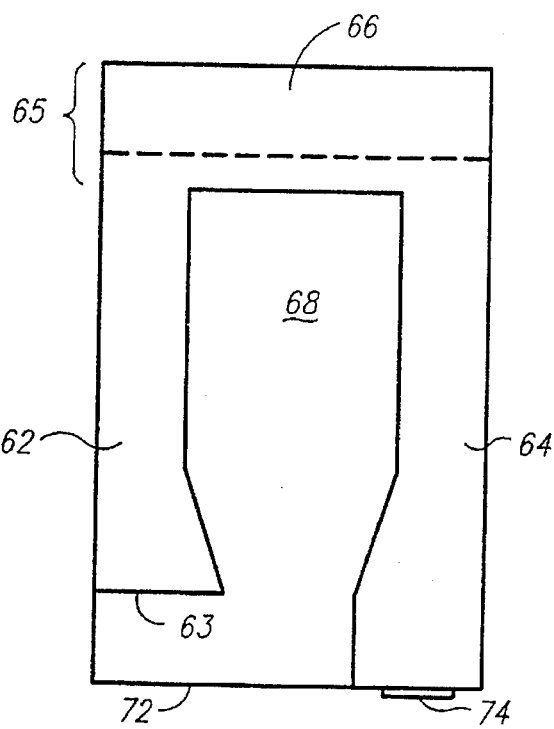
FIG. 8A  FIG. 8B
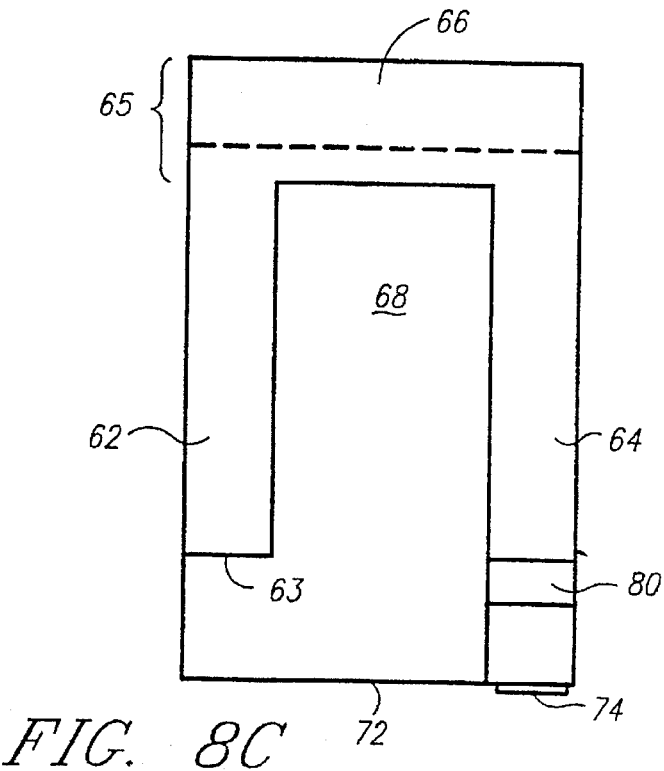
FIG. 8C

ROLL INSENSITIVE AIR BEARING SLIDER

This application is a continuation of application Ser. No. 08/538,688, filed Oct. 3, 1995, now abandoned, which is a divisional of application Ser. No. 08/310,002, filed Sep. 20, 1994, now abandoned, which is a continuation-in-part of application Ser. No. 08/069,059, filed May 28, 1993, now U.S. Pat. No. 5,396,386.

TECHNICAL FIELD

This invention relates generally to air bearing sliders for use with recording media and, more particularly, to a slider having reduced sensitivity to variations in the roll, skew, and crown of the slider.

BACKGROUND

Conventional magnetic disk drives are information storage devices which utilize at least one rotatable magnetic media disk with concentric data tracks, a read/write transducer for reading and writing data on the various tracks, an air bearing slider for holding the transducer adjacent to the track generally in a flying mode above the media, a suspension for resiliently holding the slider and the transducer over the data tracks, and a positioning actuator connected to the suspension for moving the transducer across the media to the desired data track and maintaining the transducer over the data track during a read or a write operation.

In magnetic recording technology, it is continually desired to improve the areal density at which information can be recorded and reliably read. Because the recording density of a magnetic disk drive is limited by the distance between the transducer and the magnetic media, a goal of air bearing slider design is to "fly" a slider as closely as possible to a magnetic medium while avoiding physical impact with the medium. Smaller spacings, or "fly heights", are desired so that the transducer can distinguish between the magnetic fields emanating from closely spaced regions on the disk.

In addition to achieving a small average spacing between the disk and the transducer, it is essential that a slider fly at a relatively constant height despite the large variety of conditions it experiences during the normal operation of a disk drive. If the flying height is not constant, the data transfer between the transducer and the recording medium may be adversely affected. It is also essential that variations in the physical characteristics of the slider, due to manufacturing tolerances, not substantially alter the flying height of the slider. If this result is not achieved, the slider's nominal fly height must be increased to compensate for variations between sliders.

An example of a parameter that can vary during normal operation of a disk drive is the radial position of a slider with respect to the rotating disk. The flying height of a slider is affected as the actuator arm is moved radially to access different data tracks. This is due to differences in the linear velocity of the disk at differing radii. In effect, the air bearing slider flies at different speeds at differing radii. Because a slider typically flies higher as velocity increases, there is a tendency for sliders to fly higher at the outer diameter of the disk. Disk drives and sliders must be designed to minimize this effect.

A slider also experiences changes in flying height due to variations in skew. Skew is a measure of the angle formed between the longitudinal axis of the slider and the direction of disk rotation as measured in a plane parallel to the disk. Skew varies in a rotary actuator disk drive as the suspension and attached slider move in an arcuate path across the disk. Skew also varies, to a lesser degree, in a linear actuator disk drive when a resiliently mounted slider moves in response to forces exerted upon it. In addition, skew is a concern due to manufacturing tolerances that may cause a slider to be mounted with a permanent, non-zero skew. For sliders mounted to either type of actuator, non-zero skew values result in a slider being pressurized at a reduced value and therefore flying lower. For this reason, it is important that a slider be relatively insensitive to variations in skew.

A slider also experiences fly height variations due to roll. For a slider with zero skew relative to disk rotation, roll is a measure of the angle formed between the surface of the disk and a plane holding the longitudinal and latitudinal axes of the slider. Variations in roll occur when a resiliently mounted slider experiences a skewed air flow or the actuator experiences a crash stop impact. Insensitivity to roll variations is a crucial requirement of air bearing sliders.

Variations in the crown of a slider can also lead to variations in fly height. Crown is a measure of the concave or convex bending of the slider along its longitudinal axis. Crown develops in sliders because of surface stresses that arise during the fabrication and suspension bonding processes. These stresses are not well controlled and therefore lead to sliders with relatively large variations in crown. Also, an individual slider can experience variations in its crown due to temperature variations that occur during the normal operation of a recording disk drive. For these reasons, it is important that the flying height of a slider not vary substantially as a result of variations in crown. Furthermore, a slider with a non-zero crown is the equivalent of a flat slider flying over a disk having small amplitude, long wavelength undulations. Therefore, since all disks have some degree of waviness, a slider that is less sensitive to variations in crown is also less sensitive to imperfections in the flatness of the recording disk it is flying over.

Finally, a slider experiences varying conditions during the high speed radial movement of the actuator as it accesses data on various portions of the disk. High speed movement across the disk can lead to large values of slider roll and skew and a resultant variation in fly height. This is yet another reason that a slider must be insensitive to changes in roll and skew.

When any of the above described variations in fly height occur, they may result in contact between the slider and the rapidly rotating recording medium. Any such contact leads to wear of the slider and the recording surface and is potentially catastrophic. Prior art slider designs have attempted to avoid this problem by addressing one or more of above described sensitivities, so as to produce a slider with uniform flying height under the varying conditions that may be experienced by the slider.

For example, U.S. Pat. No. 4,894,740 to Chhabra et al. addresses the problem of roll sensitivity by placing a transducing element on the center rail of a three rail slider. This solution, while effective, has the disadvantage of moving the transducing element away from the edge of the slider. Therefore, because a slider only flies correctly when it is more than a certain minimum distance from the outer edge of a rotating disk, those areas of the disk from the center of the slider to the edge of the slider cannot be used. This can result in a loss of 2 to 4% of the usable storage capability of the disk.

Another approach is disclosed in U.S. Pat. No. 4,870,519 to White. White addresses the problem of roll and skew sensitivity by attempting to design a slider that is subjected to very little roll under varying skew conditions. The solution proposed by White requires a well-controlled contour to be placed along corresponding edges of a slider's side rails. These contours can present manufacturing difficulties because they require a controlled etch depth in addition to the traditional process used to create the recess between the rails.

For the foregoing reasons, there is a need for an air bearing slider that maintains a relatively uniform flying height; can accommodate a transducer near its side edge; is insensitive to variations in roll, skew and crown; and does not require additional features that substantially add to the difficulty of manufacturing the slider.

SUMMARY OF THE INVENTION

The present invention is directed to an air bearing slider that satisfies this need by reducing the length of one side rail while biasing the roll and pitch of the slider to ensure that the rail carrying the transducing element remains the lowest rail. Reducing the length of the rail is characterized as removing a portion of the rail or recessing a portion of the rail from the original rail plane. In one embodiment, the invention comprises an air bearing slider having a pair of side rails disposed along the sides of the air bearing surface so as to form a recessed section between the side rails. The recessed section is open at both the leading and trailing ends of the slider. In addition, each side rail has a tapered section or etched step at the leading edge of the slider. One rail carries the transducer and is referred to as the active rail. The active rail extends for the entire length of the slider body from the leading edge to the trailing edge. The rail without a transducer is referred to as the inactive rail and extends from the leading edge toward the trailing edge, but does not extend all the way to the trailing edge. Under some skew, accessing, and crash stop impact conditions, the resulting slider roll causes the flying height of the inactive rail to drop. By proper selection of the length, shape and width of the inactive rail, the roll can be biased such that the fly height of the inactive rail remains higher than that of the active rail even under worst case conditions. Therefore, the active rail always remains the lowest flying rail and the minimum slider to disk spacing is larger than it would be for a standard slider design. In addition, the shortened rail and biased roll provide reduced sensitivity to variations in crown and skew.

In a second embodiment, the slider has a continuously tapered cross-rail or etched step along the entire front edge thereof and a pair of side rails. The area between the two rails is recessed to provide a region of subambient or negative pressure. As in the first embodiment, the inactive rail is shortened to provide roll, crown, and skew insensitivity. Alternative embodiments include two negative pressure regions formed by a combination of U-shaped and/or L-shaped rails.

In additional embodiments, a channel is formed near the trailing end of the active rail of the preceding embodiments. By combining a short inactive rail with a channel in the active rail, low flying heights at low gram loads can be achieved with the inactive rail always flying higher than the active rail.

This invention thus provides an air bearing slider with reduced sensitivity to variations in roll, skew, and crown while maintaining a uniform flying height above a recording disk. Further features and advantages of the invention will become apparent from the following specification and the accompanying drawings.

BRIEF DESCRIPTION OF THE DRAWINGS

FIGS. 8(a)–(c) are embodiments of the air bearing slider of FIG. 7 having shaped rails;

DETAILED DESCRIPTION

Figure 1:
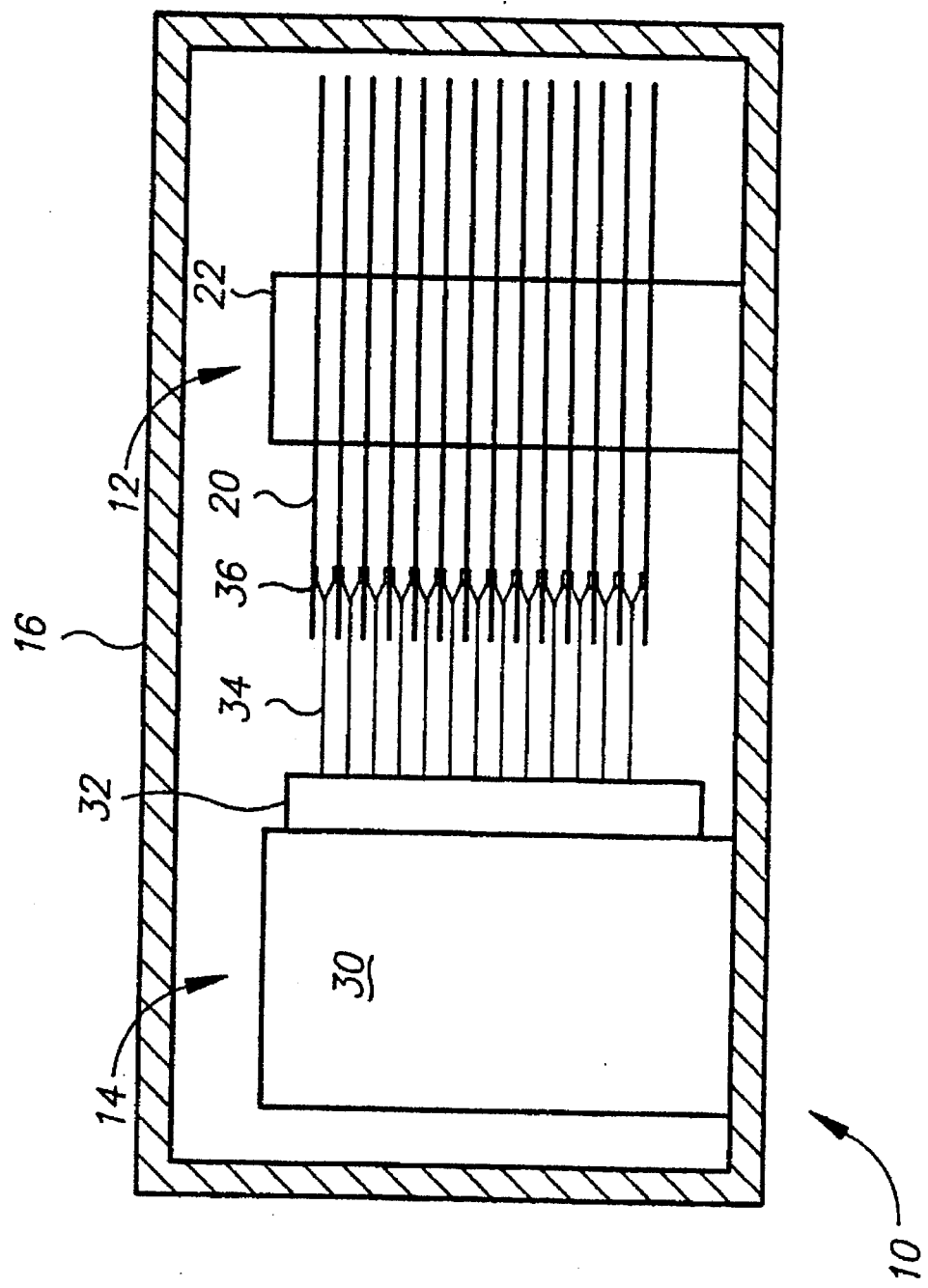
FIG. 1 is a schematic diagram of a disk drive system useful for practicing the present invention.

With reference to FIG. 1, a schematic diagram of a magnetic recording disk drive useful for practicing the present invention is illustrated. The system comprises a disk spindle assembly 12 and a head actuator assembly 14. Spindle assembly 12 and head actuator assembly 14 are located within a sealed housing 16 to prevent particulate contamination. Spindle assembly 12 comprises a plurality of magnetic recording disks 20 which are mounted to a spindle 22. Spindle 22 is rotated by an in-hub electrical motor which is not illustrated. Head actuator assembly 14 comprises a voice coil motor 30 which moves an actuator arm assembly 32 relative to the disks 20. Assembly 32 has a plurality of actuator arms 34, each of which is positioned in a space between two adjacent disks 20. Each actuator arm 34 has a pair of air bearing sliders 36 adapted for carrying read/write transducers adjacent to the disks 20. One read/write transducer flies adjacent to the disk positioned above the actuator arm 34 and the other flies adjacent to the disk positioned below the actuator arm 34.

In operation, spindle 22 is rotated by the in-hub motor and motor 30 moves the actuator arms 34 between the disks 20 to the desired track location. One of the read/write transducers attached to sliders 36 then reads or writes data on the desired track.

Figure 2:
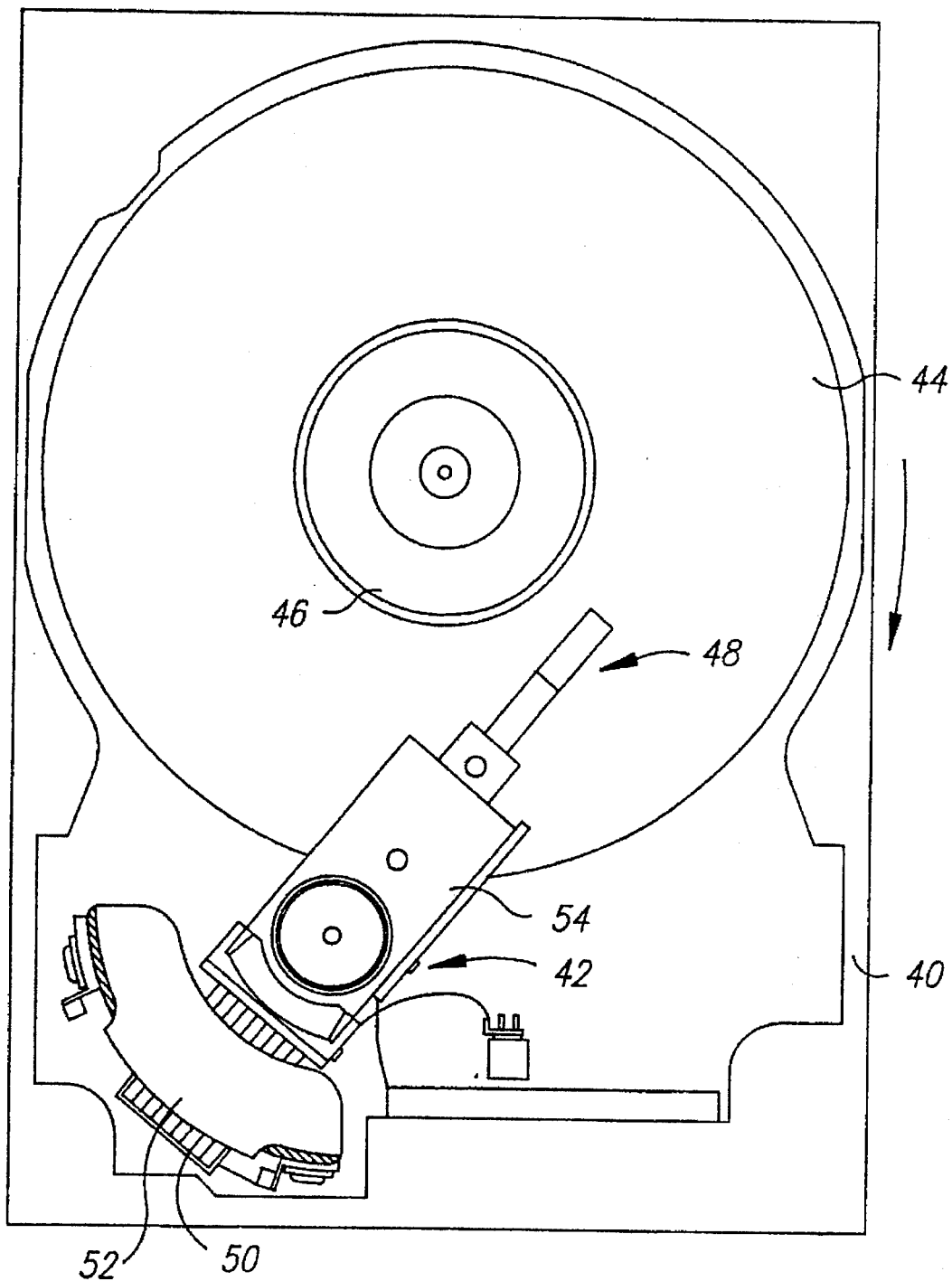
FIG. 2 is a top view of a magnetic recording mechanism with a rotary actuator useful in practicing the present invention.

Referring now to FIG. 2, a data recording disk drive useful for practicing the present invention is illustrated. The disk drive includes a housing 40 in which is mounted a rotary actuator 42, an associated disk 44 and a drive means 46 for rotating the disk 44. The rotary actuator 42 moves a suspension assembly 48 in an arcuate path over the disk 44.

The rotary actuator 42 includes a voice coil motor, which comprises a coil 50 movable within the magnetic field of a fixed permanent magnet assembly 52. An actuator arm 54 is attached to the movable coil 50. The other end of the actuator arm 54 is attached to a suspension assembly 48 which holds an air bearing slider and its attached read/write transducer in a flying relationship adjacent to disk 44.

Figure 3A:
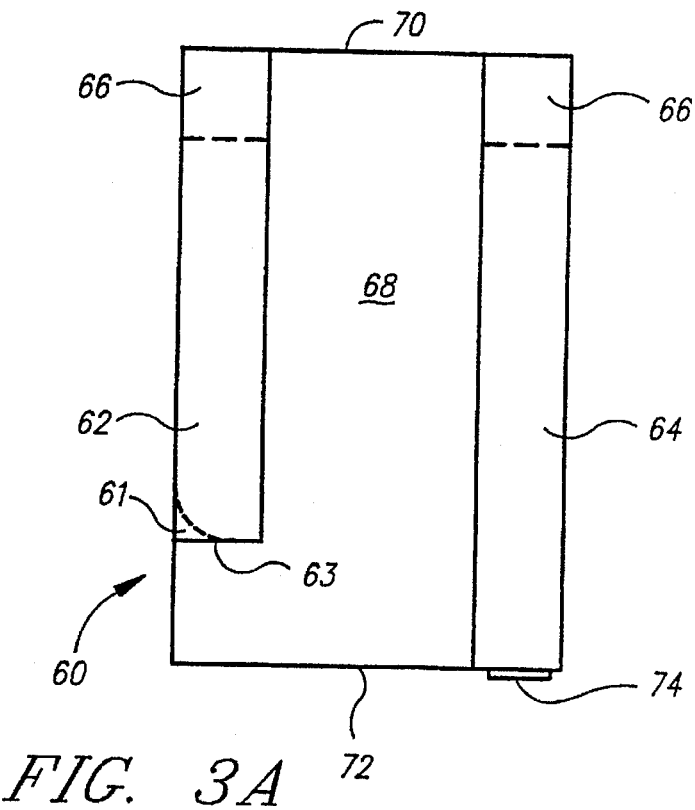
FIG. 3(a) is a bottom plan view of an air bearing slider embodying the present invention.
Figure 3B:
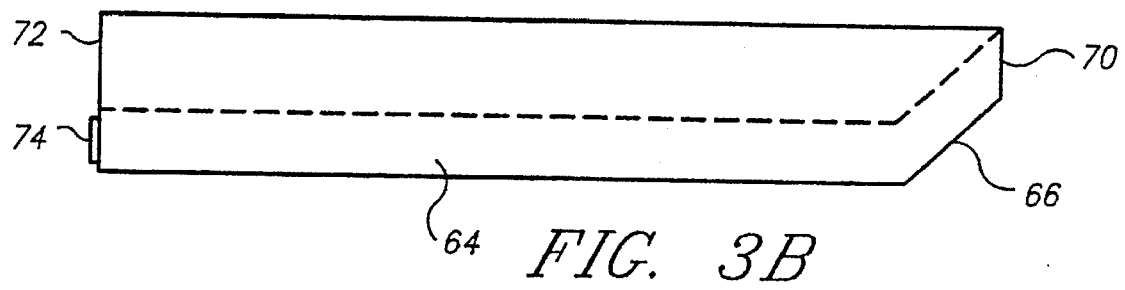
FIG. 3(b) is a side plan view of the air bearing slider of FIG. 3(a)
Figure 3C:
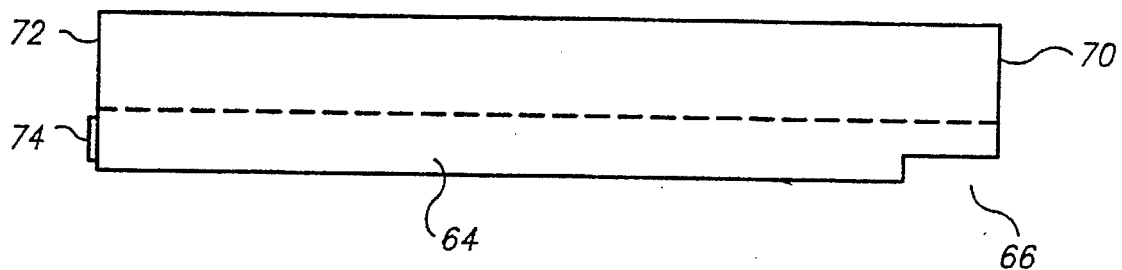
FIG. 3(c) is another embodiment of the air bearing slider of FIG. 3(a) having an etched step at the leading edge.

With reference to FIGS. 3(a)-(c), the air bearing surface of a magnetic head slider, made in accordance with the present invention, is formed with two side rails 62 and 64. The inner sides of the two rails border a recessed section 68 that is formed by etching, laser ablation, ion milling, or other techniques as are known in the art. The recessed section 68 extends from the leading edge 70 to the trailing edge 72. Transducer 74 is bonded to or integrally formed at the trailing edge of the active rail 64. The side rails 62 and 64 each have a tapered section 66, illustrated in FIG. 3(b), at the leading edge 70. Alternatively, section 66 could be an etched step, as illustrated in FIG. 3(c), formed by one of the techniques applicable to recessed section 68. In general, etched steps are the functional equivalent of tapered sections for all embodiments of the present invention.

The active rail 64 extends from the tapered section 66 to the trailing edge 72 of the slider. The inactive rail 62 extends from the tapered section 66 toward the trailing edge 72 but does not extend the entire length of the slider.

The inactive rail 62 is illustrated as having a rectangular termination edge 63 but this is not a requirement of the present invention. Termination edge 63 may be slanted with respect to the longitudinal axis of the slider; may have a slight radius as a result of machining operations; or may have other shapes without seriously affecting the performance of the present invention. Similarly, the width of rail 62 is illustrated as being identical to inactive rail 64 but, for many applications, would be wider so as to provide a lift roughly equivalent to that of the full length rail 64.

The slider shown in FIG. 3(a) preferably has a width of 1.5 mm, a length of 2.045 mm and a rail width of 0.254 mm. The tapered section 66 extends 0.320 mm in from the leading edge 70 and the inactive rail 62 has a length of 1.5 mm. As is known in the art, all of the preceding dimensions can be varied to meet an array of design requirements without departing from the scope of the present invention.

The length and width of inactive rail 62 is determined by trading off several parameters, the three most important of which are flying height variation, crown sensitivity, and roll bias. For example, as will be explained in further detail below, if the rail 62 is shortened, the sensitivity of the slider to crown variations is reduced while the roll bias of the slider is increased. If the roll bias becomes too large, one of the rails may impact the disk. For most applications, the inactive rail 62 would have a length greater than 30% and less than 97% of the slider body length. However, as would be apparent to one skilled in the art, sliders with an inactive rail length greater than 97% would still provide, to a lesser extent, the advantages of the present invention. Similarly, inactive rail lengths under 30% may be preferred for certain applications and would fall within the scope of the present invention.

It should be noted that because all the edges of the slider in FIG. 3(a) are linear, it can be manufactured using low cost machining operations without the need for expensive photolithographic or etching steps. This can be a major advantage when low cost is a primary design goal. However, it will be understood that alternative rail shapes may be desirable for particular applications.

Figures 4A, 4B:
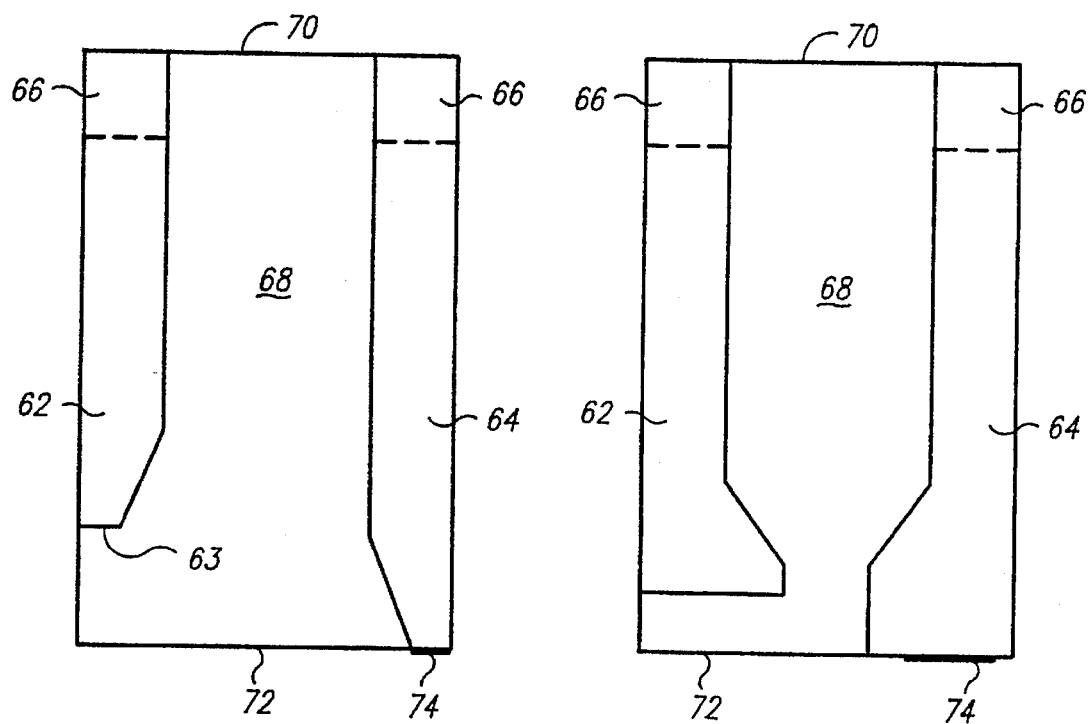
FIGS. 4(a)–(d) and FIGS. 5(a)–(d) are bottom plan views of embodiments of the slider of FIG. 3(a) having shaped rails.
Figures 4C, 4D:
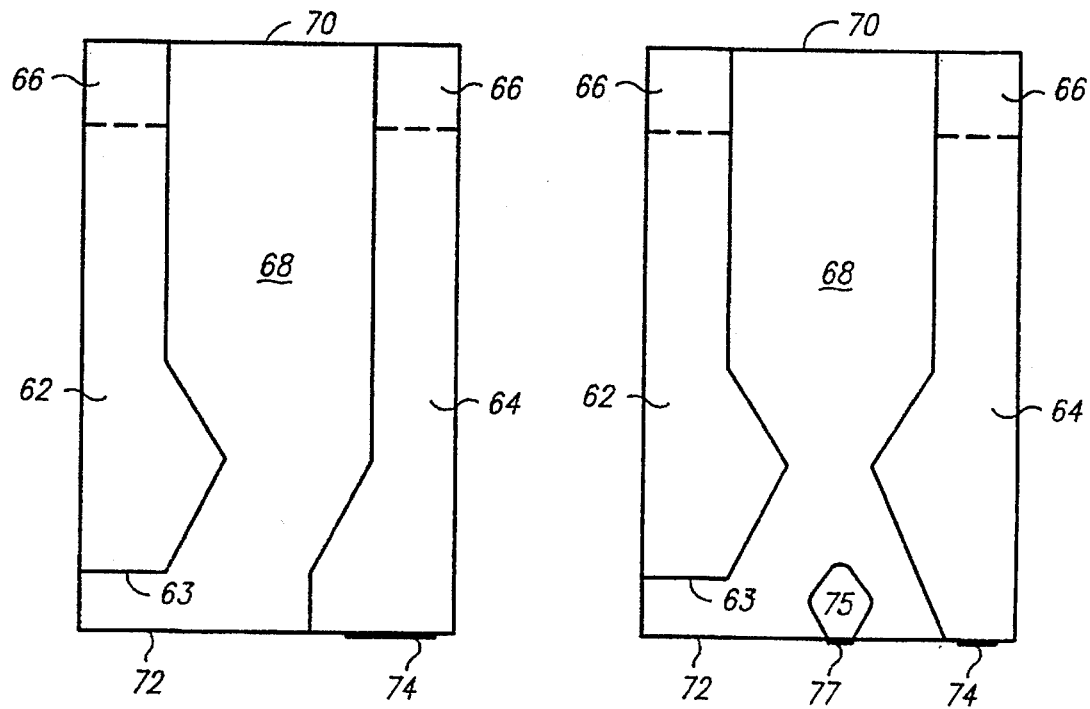

FIGS. 4(a)-(d) and FIGS. 5(a)-(d) show alternative rail configurations for the slider of FIG. 3(a) for providing desired fly height characteristics. For example, the slider of FIG. 4(a) includes inactive and active side rails 62, 64 that narrow in the direction of the trailing edge 72. Patterning processes, such as Photolithography, are required to shape the rails in this manner. Shaping of the rails provides additional flexibility to the slider design. This embodiment provides reduced load bearing surfaces at the slider's trailing edge 72. Alternatively, the slider of FIG. 4(b) has side rails 62,64 that widen in the direction of the trailing edge 72, thus providing increased load bearing surfaces in that region. In addition, the flared section of the active rail allows it to carry a large transducing element 74 without requiring the entire rail 64 to be wide enough to accommodate the transducer. FIG. 4(c) is a variation of FIG. 4(b), wherein the inactive rail 62 widens and then narrows in the direction of the trailing edge 72. FIG. 4(d) shows a slider having both inactive and active rails 62,64 which first widen and then narrow in the direction of the trailing edge 72. In addition, the slider is shown with an optional island 75 for supporting a second transducer 77 or for providing a center-rail slider configuration. It will be understood that the island 75 may be replaced with a center rail extending the full length of the slider for the same purpose.

Figure 5A:
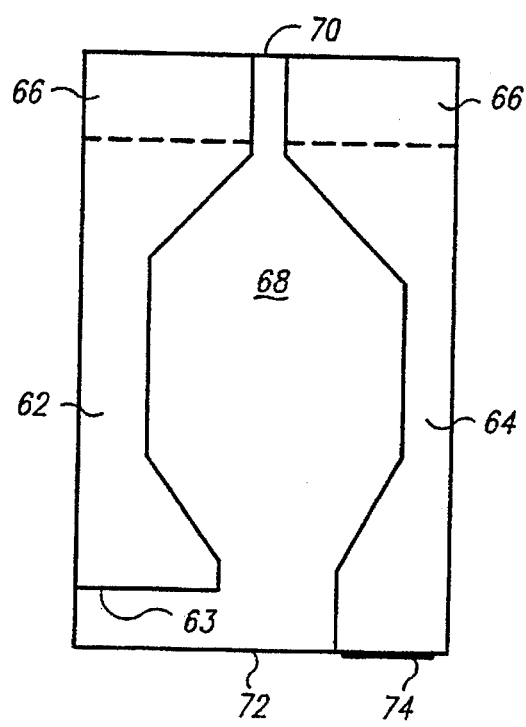
Figure 5B:
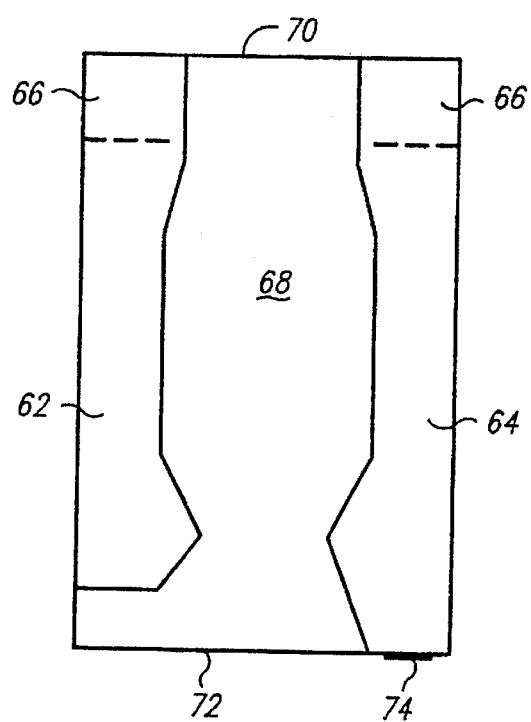
Figure 5C:
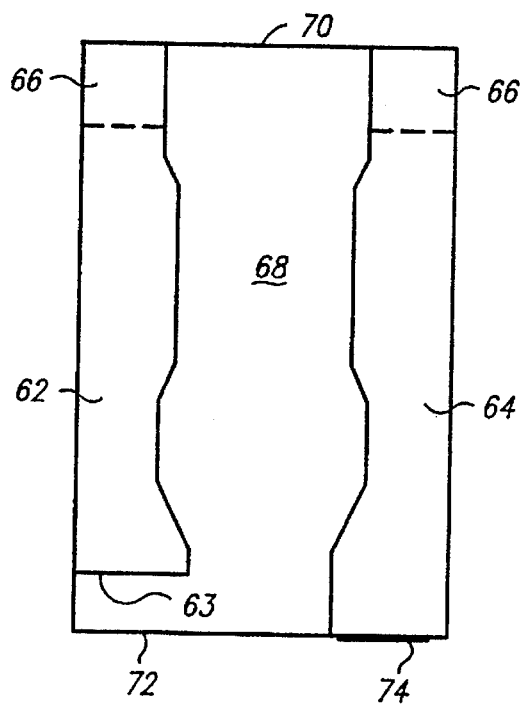
Figure 5D:
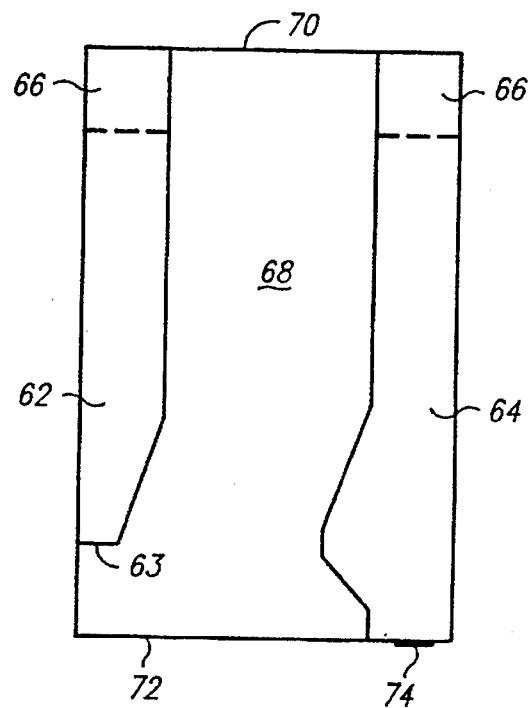

FIGS. 5(a)-(e) show other inactive/active rail configurations for providing alternative load bearing distributions. In FIG. 5(a), both the inactive and active rails 62,64 are wide and tapered at the leading edge 70 to enhance slider lift-off and increase pitch. The rails 62,64 narrow and then widen again in the direction of the trailing edge 72 to provide the benefits of increased load bearing surface and a wider transducer region on the active rail at the slider's trailing edge. FIG. 5(b) shows a slider wherein the side rails 62,64 first narrow, then widen, then narrow again from leading edge 70 to trailing edge 72. In contrast, the slider of FIG. 5(c) includes inactive and active rails 62,64 which first widen, then narrow, and then widen again from leading edge 70 to trailing edge 72. FIG. 5(d) shows a combination of a tapered inactive rail 62 and an active rail 64 with increased load bearing surface at the trailing edge 72. It shall be understood, however, that these embodiments are merely exemplary, and that any combination of the rail shapes shown as well as others may be used to achieve desired fly height characteristics without departing from the spirit and scope of the present invention.

In operation, a slider such as that shown in FIG. 3(a) is held adjacent to a rotating disk by a resilient suspension assembly. Air flowing beneath the rails 62 and 64 and recessed section 68 forms a hydrodynamic air bearing that causes the slider to lift-off from the disk surface. The leading edge 70 of the slider flies farther from the disk than trailing edge 72, resulting in the slider flying at a pitch angle with respect to the surface of the disk.

Figure 6:
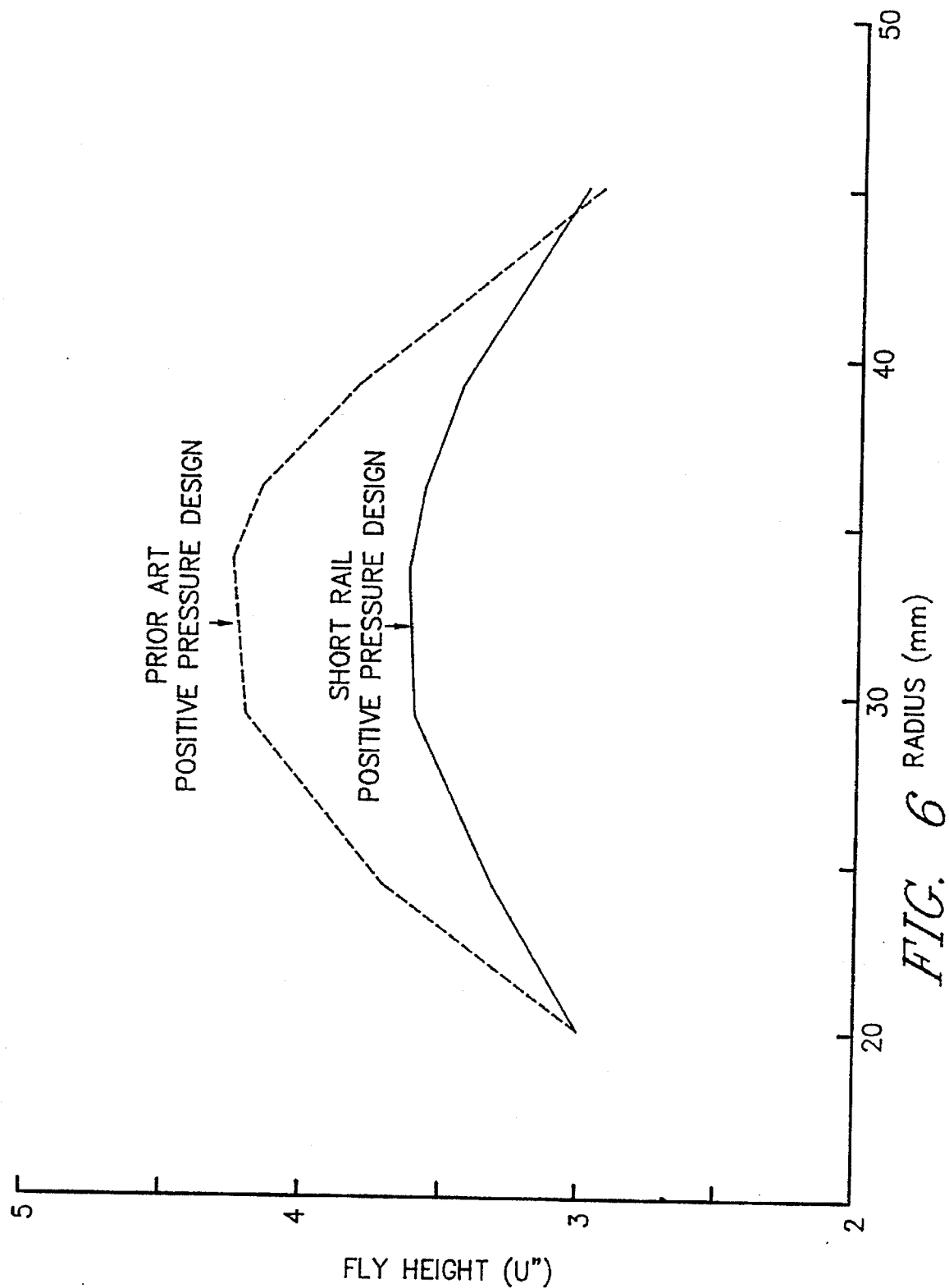
FIG. 6 is a graph illustrating the relationship between flying height and radial disk position for the embodiment of the invention illustrated in FIG. 3(a)

The configuration of the slider results in a much flatter fly height profile than a prior art slider of similar size and shape having two full length rails. This is illustrated in FIG. 6 which is a graph illustrating the variation in fly height at varying disk radii for the slider of FIG. 3(a) as compared to a slider with full length rails. FIG. 6 was generated using two computer models of air bearing sliders flying over a disk. A first model had the air bearing characteristics of a slider with two full length side rails, and a second model had the air bearing characteristics of the slider shown in FIG. 3(a), according to the present invention. Both sliders were assumed to be mounted in a rotary actuator drive having approximately zero skew at the inner diameter and a minimum spacing of approximately 3 microinches. As can be seen from the graph, the slider embodying the present invention showed a much smaller variation in fly height when compared to an equivalent slider having full length rails. It should be noted that the variations in fly height indicated in FIG. 6 are due not just to variations in the velocity of the disk but also to variations in skew as the rotary actuator moves the slider across a 3.5 inch disk.

The previously described embodiment of the invention has many advantages in addition to its reduced sensitivity to skew and radial position. One such advantage is the reduced sensitivity of the present invention to variations in the crown of the slider. As mentioned above, manufacturing tolerances lead to relatively large variations in slider crown. A key advantage of the present invention is the relatively small effect that such variations have on the flying height of the slider. This can be understood by examining the variations in fly height between a slider having full length rails and a slider made in accordance with the present invention. Assuming both sliders have a crown that changes such that the leading edge 70 and the trailing edge 72 move toward the disk, the slider with full length rails experiences a decrease in pressure under each rail and therefore, flies lower. The present invention lessens this effect in the following manner. Because the surface area under the inactive rail 62 is reduced, the effect of any crown variation is heightened and the rail 62 experiences a greater reduction in the lifting force generated by the rail. This causes the slider to roll such that the active rail 64 rolls upward. This effect partially compensates for the pressure drop under active rail 64 caused by the crown and results in transducer 74 experiencing a much smaller change in fly height. The fact that inactive rail 62 experiences a larger drop than it might otherwise is not a concern. Because the slider flies at a pitch angle and the rail 62 is shortened, the portion of slider closest to the disk continues to be the area near transducer 74.

Another advantage of the present invention is better dynamic performance of the slider during data accessing. FIG. 6 illustrates the steady state flying height of the transducer 74 at various radii. However, slider fly heights are also affected during the movement of the actuator from one radial position to another. During the actuator's motion, the slider is subjected to an additional skew which can cause the slider fly height to drop. In addition, the large skew exerts a force on the slider that tends to give it a large roll. Because of the above described insensitivity of the present invention to changes in roll or skew, the flying height of the slider experiences much less of a drop in flying height as compared to a full length rail slider. Computer simulations indicate that the slider of FIG. 3(a) would experience a drop of 16 nm in moving from the inner diameter (ID) to the outer diameter (OD) of the disk at 1.5 meters/sec. A similar slider having two full length rails would experience a drop of 26 nm during the same data access movement.

Figure 7:
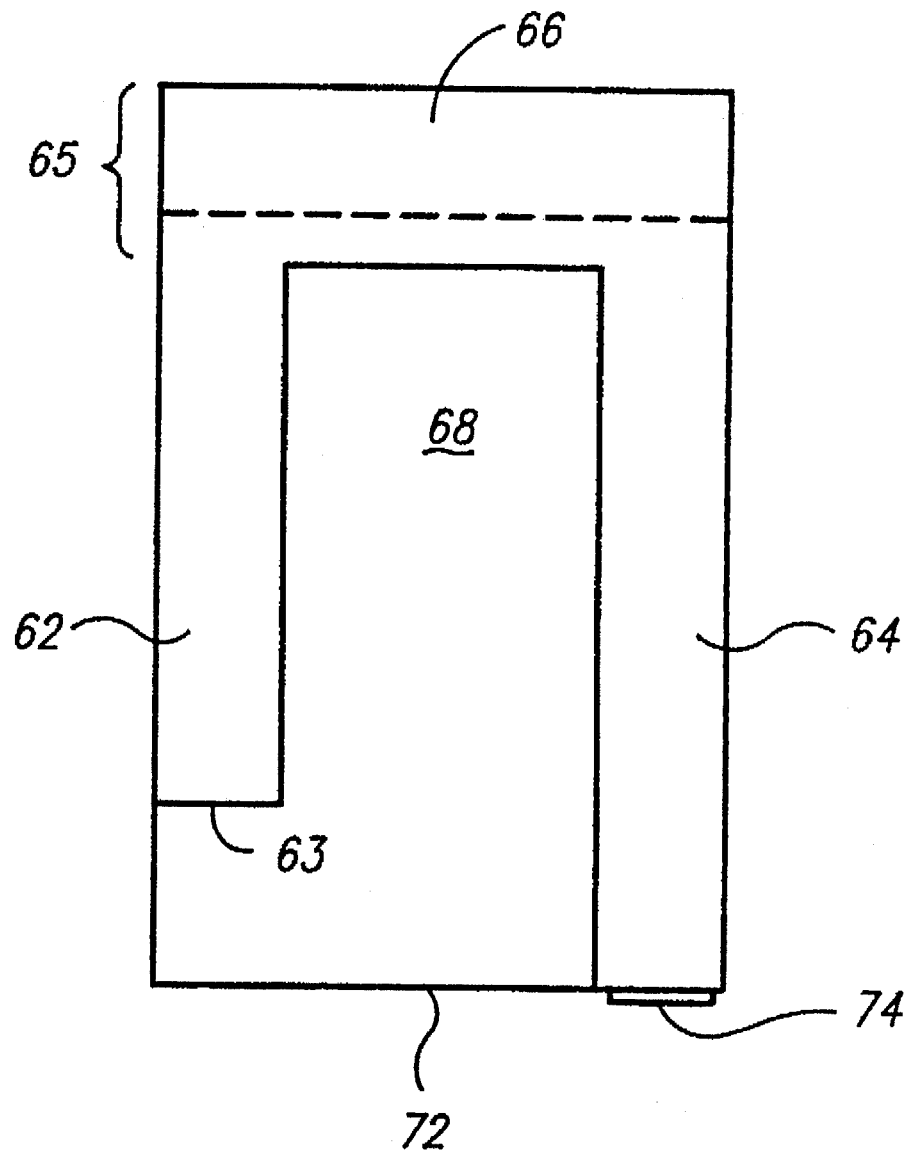
FIG. 7 is a bottom plan view of a negative pressure air bearing slider embodying the present invention.

With reference to FIG. 7, a negative pressure straight rail air bearing is illustrated embodying the present invention. The slider is formed with two side rails 62 and 64. In addition, a tapered cross rail 65 extends across the entire width of the slider. Alternatively, cross rail 65 could have an etched step, similar to the one illustrated in FIG. 3(c), formed by one of the techniques applicable to recessed section 68. The cross rail 65 and the inner sides of the two rails 62 and 64 border on a recessed section 68 that is formed by etching, laser ablation, ion milling or other techniques as are known in the art. In operation, the recessed section 68 forms a pocket of subambient or negative pressure which reduces the requirement of high static loading on the slider.

Unlike the recessed section of the previous embodiment, the depth of the recessed section 68 of the present embodiment must be of a controlled depth, typically several microns, to achieve the proper flying characteristics. As in the positive pressure embodiment, a transducer 74 is bonded to or integrally formed at the trailing edge of the active rail 64. The active rail 64 extends from the cross rail 65 to the trailing edge 72 of the slider. The inactive rail 62 extends from the tapered section 66 toward the trailing edge 72 but does not extend the entire length of the slider.

The configuration of the slider of FIG. 7 results in a much flatter fly height profile than a prior art slider of identical size and shape having two full length rails. In addition, the advantages mentioned above with respect to the embodiment of FIG. 3(a) apply to the slider of FIG. 7 and all other described embodiments.

In addition to the benefits of the embodiment illustrated in FIG. 3(a), the negative pressure embodiment of FIG. 7 allows the slider to be used with a lower static load. Lower static loads are desirable because they lessen the likelihood of disk wear or damage during the sliding contact that occurs when disk rotation is initiated. In addition, lower static loads reduce the stiction forces between the slider and the media at zero velocity. Overcoming these forces can wear or damage the disk and the slider assembly.

FIGS. 8(a) and 8(b) illustrate embodiments of the slider of FIG. 7 with shaped rails. Again, shaping requires some photolithographic process. It shall be understood that a broad range of rail shapes, including those shown in FIGS. 4 and 5 above, may also be applied beneficially to the negative pressure slider of FIG. 7 without departing from the effectiveness of the present invention. FIG. 8(c) shows the slider of FIG. 7 with a transverse channel in the active rail. This feature will be discussed below.

Figure 9A:
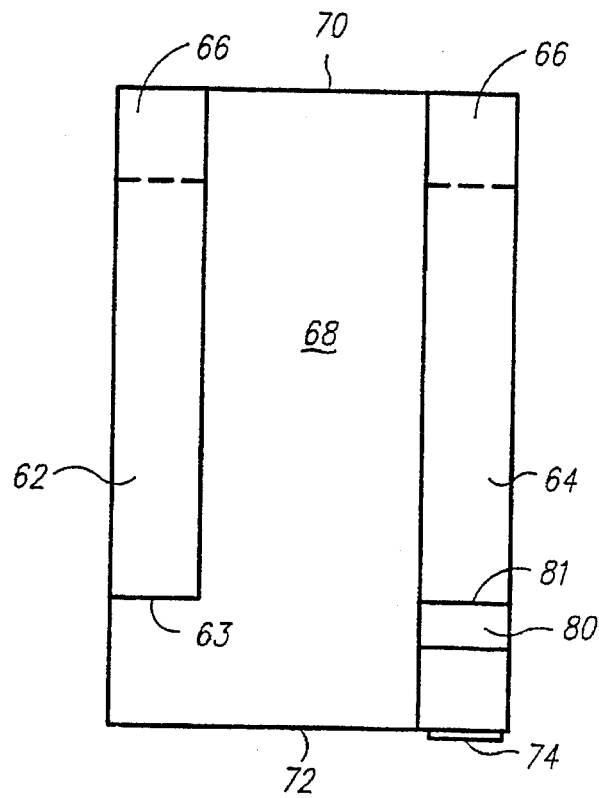
FIGS. 9(a) and 9(b) are bottom plan views of the slider of FIG. 3(a) with a channel passing through the active rail.
Figure 9B:
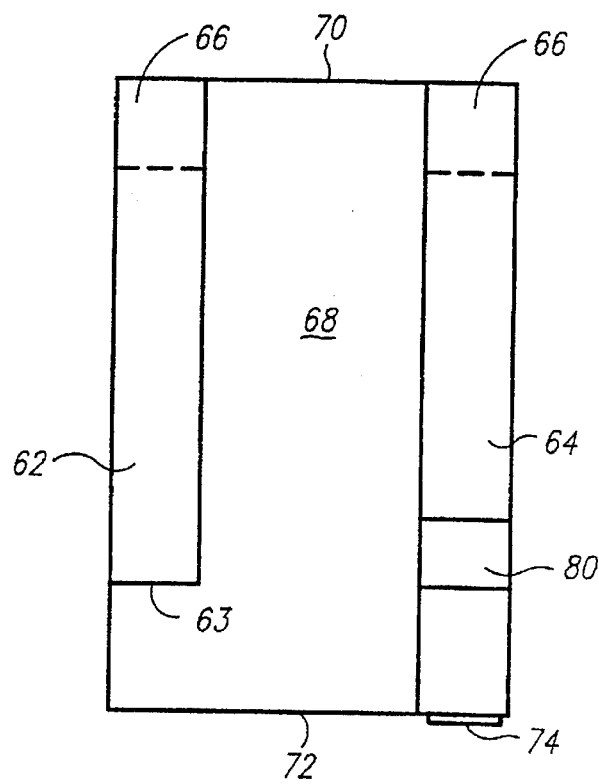

With reference to FIGS. 9(a) and 9(b), embodiments of the present invention, similar to that of FIG. 3(a), are illustrated. The embodiments of FIGS. 9(a) and 9(b) are identical to that of FIG. 3(a) with the addition of a channel 80 in the active rail 64. For manufacturing ease, the leading edge 81 of channel 80 may be aligned with the termination edge 63 of the inactive rail 62, as shown in FIG. 9(a), so that channel 80 and rail 62 may be machined in the same operation. Alternatively, it may be placed elsewhere along the rail near the trailing edge, as shown in FIG. 9(b). In addition to the benefits of the embodiment illustrated in FIG. 3(a), the channel 80 allows the slider to be used with a lower static load. Lower static loads are desirable for the reasons discussed above with respect to the negative pressure embodiment of FIG. 7. It shall be understood that the channel 80 may be beneficially applied to all other embodiments of the present invention.

It should be noted that while channel 80 provides another degree of design flexibility, it decreases the stiffness of the air bearing that is formed between the slider and the disk. For this reason, the channel 80 would typically be used on slider air bearing surfaces formed by machining processes. If the air bearing surface is formed by patterning techniques, such as photolithography, the advantages of slot 80 can be achieved by other means without sacrificing air bearing stiffness.

Figure 10:
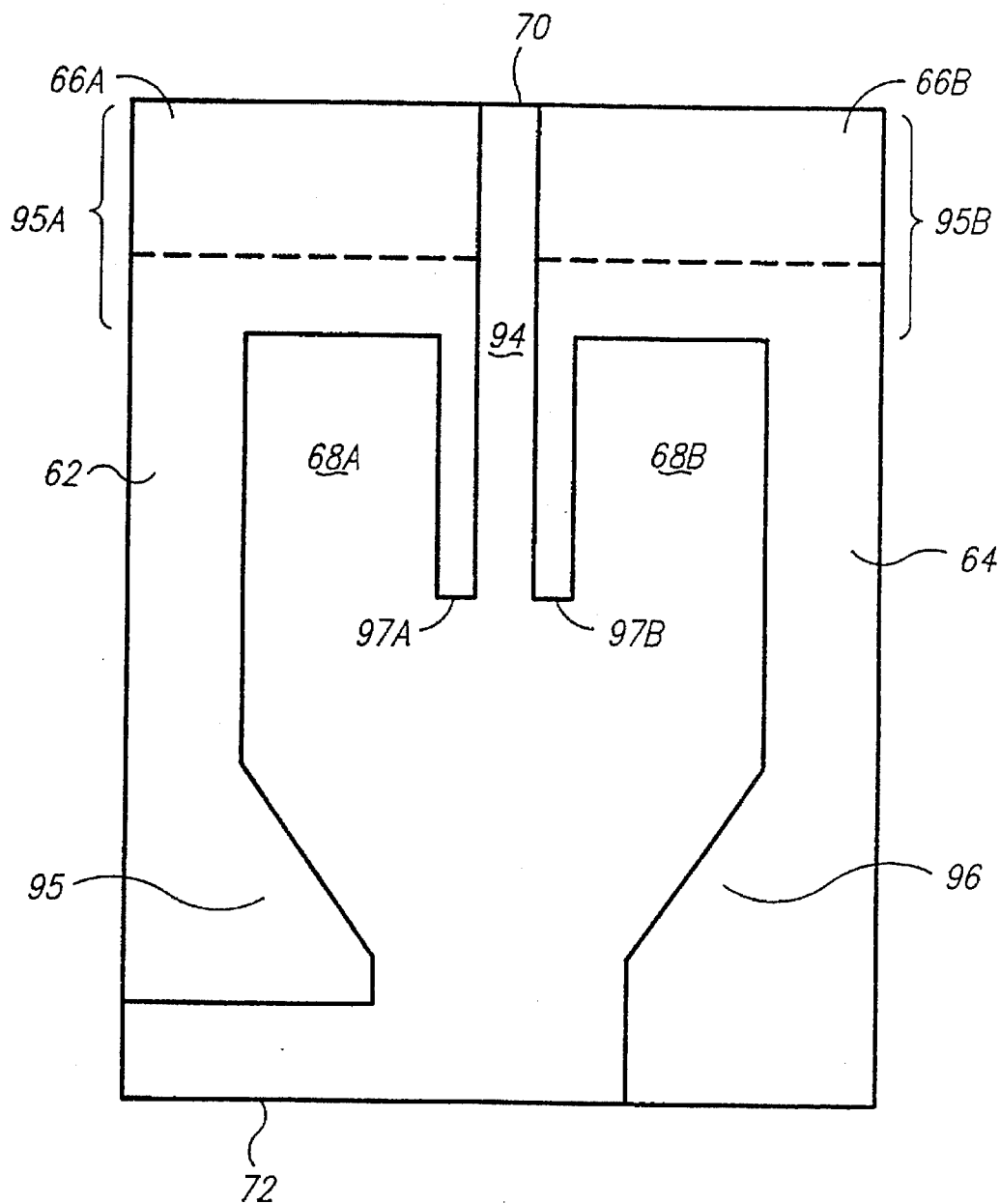
FIG. 10 is a bottom plan view of a preferred embodiment of the invention having two negative pressure regions and shaped rails.

With reference to FIG. 10, a preferred embodiment of the present invention is illustrated. The slider is formed with two U-shaped rails. Each U-shaped rail includes a side rail 62, 64, a cross rail 95A,95B with a tapered section 66A,66B at the leading edge 70, and a subrail 97A,97B extending toward the trailing edge 72. The U-shaped rails border on recessed sections 68A,68B which are formed by etching, ion milling or other techniques. In operation, the recessed sections 68A, 68B form two pockets of negative pressure which reduce the requirement of high static loading on the slider. A channel 94 passes between the sub-rails 97A,97B. A transducer 74 is bonded to or integrally formed on the trailing edge of the active rail 64. The inactive rail 62 extends from the tapered section 66A toward the trailing edge 72, but does not extend the entire length of the slider. The active rail 64 extends from the tapered section 66B to the trailing edge 72 of the slider.

The following dimensions for the elements of slider are illustrative only and not meant to limit the scope of the present invention. The slider has a width of 1.5 mm, a length of 2.045 mm, a rail width of 0.221 mm for the active rail 64, and a rail width of 0.311 for the inactive rail 62. The tapered sections 66A and 66B extend 0.320 mm in from the leading edge 70 and the inactive rail 62 has a length of 1.7 mm. The sub-rails 97A and 97B begin 0.470 mm from leading edge 70, have a length of 0.530 mm and a width of 0.1 mm. Finally, the flare 96 on the trailing end of active rail 64 begins 1.2 mm from the leading edge 70 and extends for 0.3 mm before reaching a width of 0.5 mm. As is known in the art, all of the preceding dimensions can be varied to meet an array of design requirements without departing from the scope of the present invention.

As illustrated in FIG. 10 and apparent from the above dimensions, the preferred embodiment is asymmetric with inactive rail 62 being wider than active rail 64. This more than compensates for the decreased surface area and therefore decreased lift of the inactive rail 62. This results in a roll bias that tilts the inactive rail away from the disk. It should be noted that the asymmetry of the preferred embodiment requires a mirror image version of the slider illustrated in FIG. 10 to be used on the opposite side of a magnetic disk.

Figure 11:
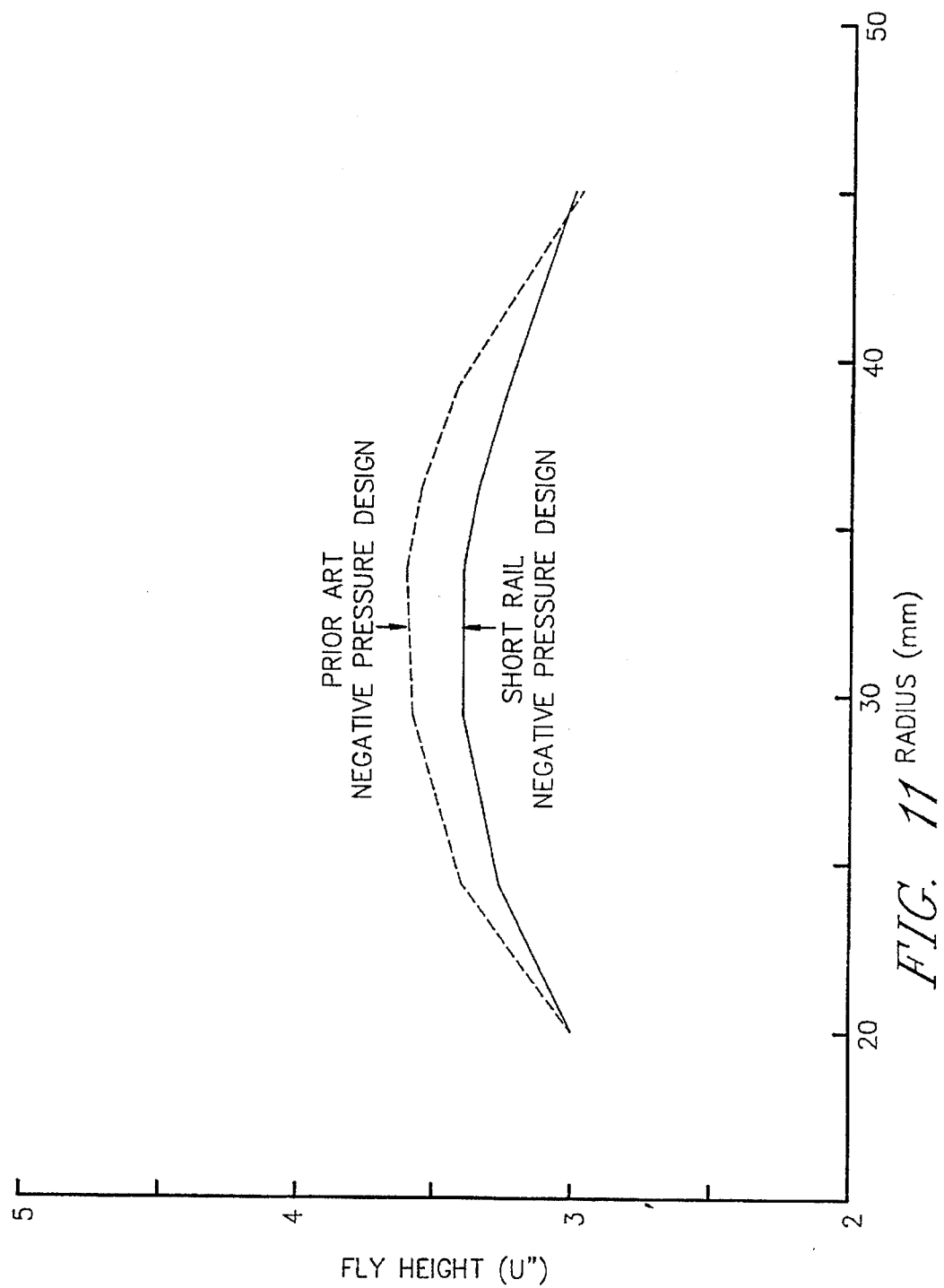
FIG. 11 is a graph illustrating the relationship between flying height and radial disk position for the embodiment of the invention illustrated in FIG. 10.

The configuration of the slider results in a much flatter fly height profile than a slider of similar size and shape having two full length rails. This is illustrated in FIG. 11 which displays the results of a computer simulation similar to that used to generate FIG. 6. FIG. 11 illustrates the effect on slider fly height of relative disk velocity and actuator skew. As can be seen from the graph, the slider embodying the present invention has a much smaller variation in fly height when compared to a similar slider having a full length inactive rail.

Figure 12A:
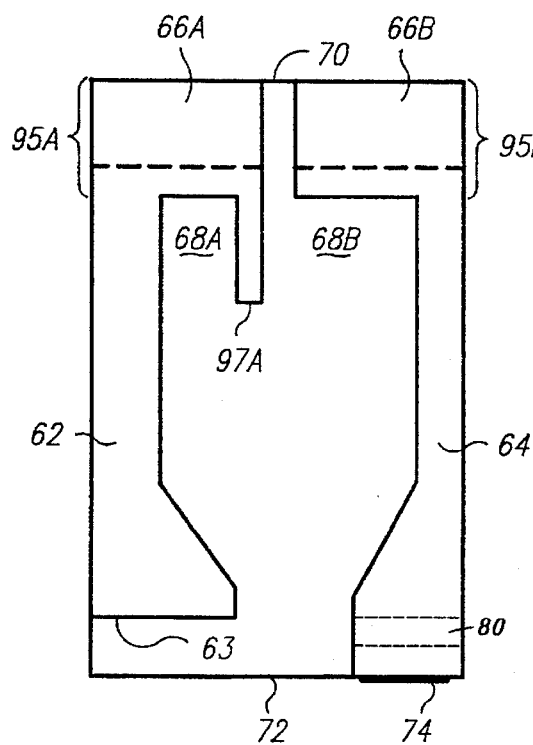
FIGS. 12(a)–(d) are variations of an air bearing slider having two negative pressure regions and features for independent control of the negative pressure of each region.
Figure 12B:
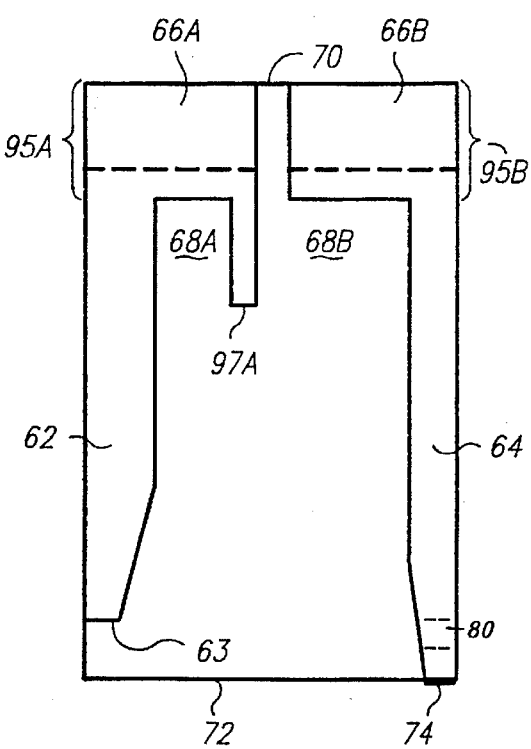
Figure 12C:
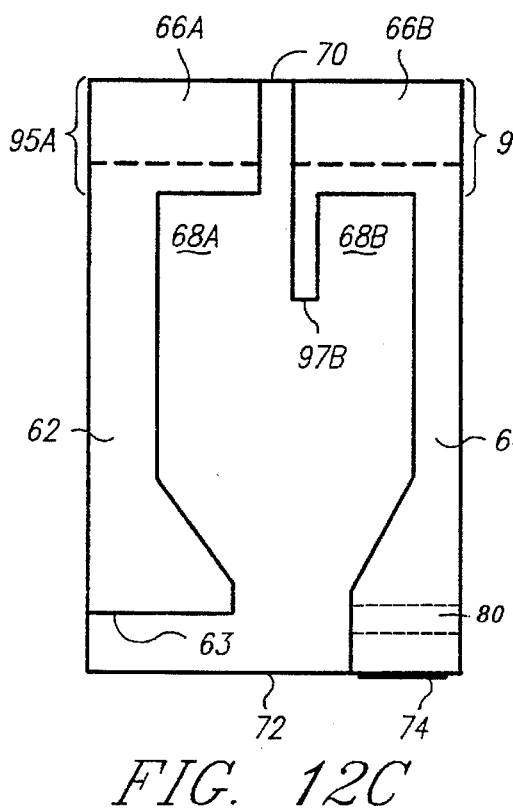
Figure 12D:
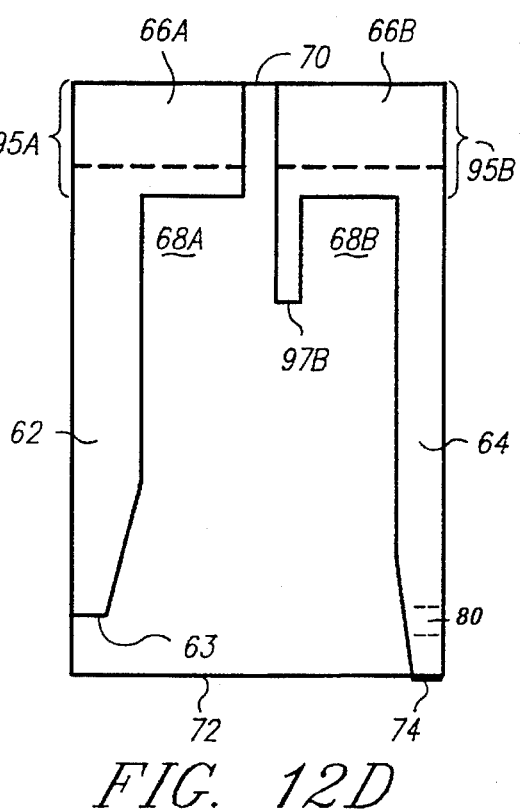
Figures 13A, 13B:
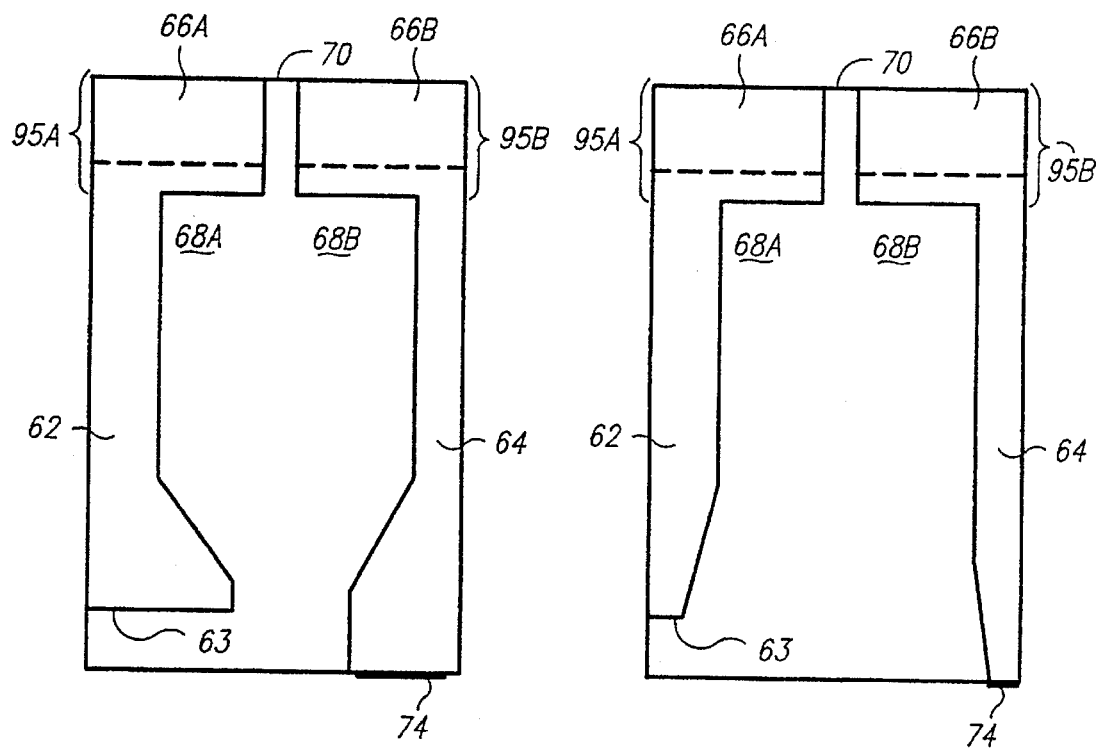
FIGS. 13(a)–(d) are additional embodiments of an air bearing slider having two negative pressure regions.

FIGS. 12(a)–(d) and FIGS. 13(a)–(d) show alternative embodiments of the slider of FIG. 10 for achieving particular fly height characteristics. The slider design in FIGS. 12(a)–(d) include two negative pressure regions 68A,68B formed by the combination of a generally U-shaped rail and a generally L-shaped rail. In FIGS. 12(a) and 12(b), the U-shaped rail includes inactive side rail 62, cross rail 95A, and subrail 97A. The L-shaped rail comprises active side rail 64 and cross rail 95B. This rail configuration provides reduced negative pressure in region 68B adjacent to the active rail. The slider of FIG. 12(a) includes flared side rails 62,64 providing the advantages discussed above. The slider of FIG. 12(b) includes narrowed rails 62,64. In FIGS. 12(c) and 12(d), the U-shaped rail includes active side rail 64, cross rail 95B, and subrail 97B. The L-shaped rail comprises inactive side rail 62 and cross rail 95A. This rail configuration provides reduced negative pressure in region 68A adjacent to the inactive rail. The slider of FIG. 12(c) includes flared side rails 62,64, and the slider of FIG. 12(d) includes narrowed rails 62,64. FIGS. 13(a) and (b) show slider embodiments without subrails 97A,97B. Two reduced negative pressure regions 68A,68B are formed by two generally L-shaped rails. The slider of FIG. 13(a) includes flared rails 62,64 and the slider of FIG. 13(b) includes tapered rails 62,64. By carefully designing with both, one, or neither of the subrails 97A,97B, the negative pressure values at the inactive and active rails 62,64 can be independently controlled to minimize the roll and the variation in fly height as the slider moves from disk ID to disk OD.

Figures 13C, 13D:
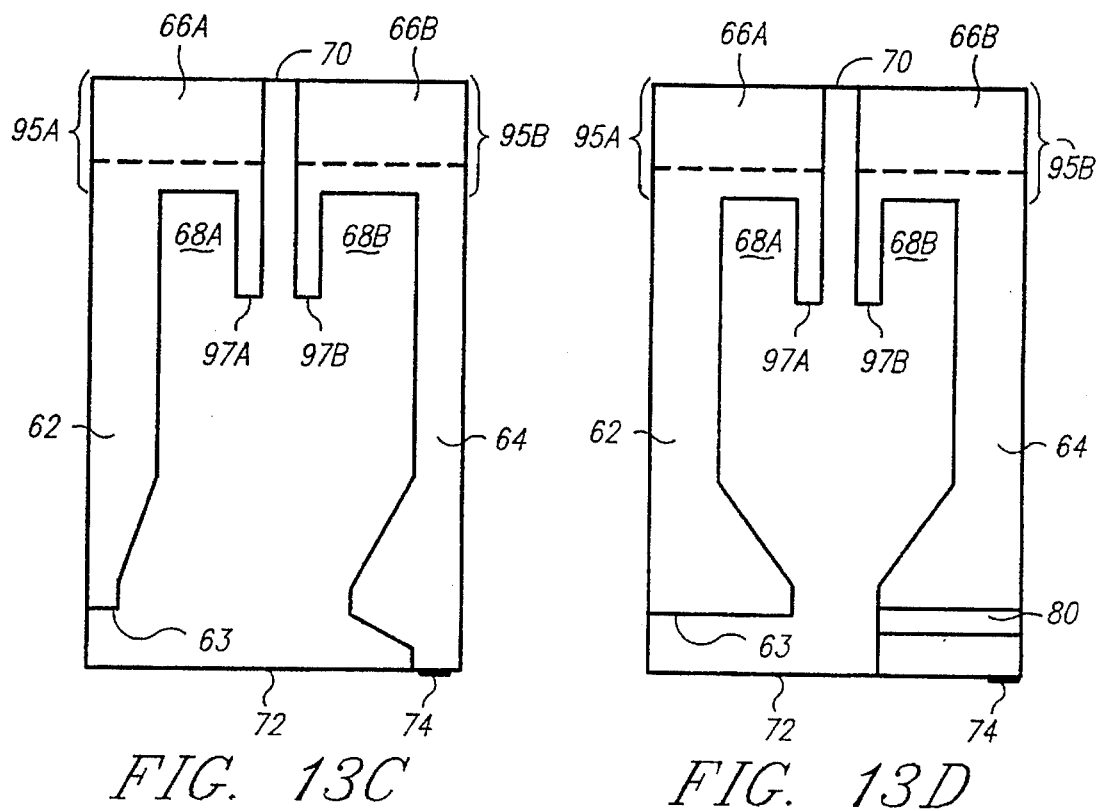

FIGS. 13(c) and 13(d) are embodiments similar to the slider of FIG. 10, but with different rail configurations. In FIG. 13(c), the inactive rail 62 is tapered and the active rail includes a widened portion near the trailing edge 72. The slider of FIG. 13(d) includes a transverse channel offering the benefits discussed previously. The rail shapes of FIGS. 12 and 13 are exemplary only. It shall be understood that any rail shapes previously described may be applied to the dual negative pressure region embodiments. In addition, numerous other rail shapes are possible without departing from the spirit and scope of the present invention.

Although the invention has been described in the context of sliders having leading edge compression features, such as tapered sections or etched steps, the advantages of the present invention apply to sliders not having these features. Similarly, although the inactive rail of the preferred embodiments is illustrated as being completely removed from the trailing end of the slider, the benefits of the present invention could also be achieved by simply recessing the trailing end of the inactive rail so as to reduce the pressurization at that point and lessen the likelihood of impact with the disk. It should be apparent that other modifications and adaptations of the described embodiments may occur to one skilled in the art without departing from the scope of the present invention as set forth in the following claims.

We claim:

1. An air bearing slider for supporting a transducer, comprising:

a slider body having a leading edge, a trailing edge, first and second side edges, and an air bearing surface;

a U-shaped rail on said air bearing surface defining a negative pressure pocket, said U-shaped rail consisting of a cross rail extending proximate to a first portion of said leading edge, and first and second leg rails extending from said cross rail in the direction of said trailing edge, said first leg rail being disposed proximate to said first side edge and having a recessed area of reduced load bearing capability at said trailing edge;

an L-shaped rail on said air bearing surface consisting of a cross rail extending proximate to a second portion of said leading edge, and a leg rail extending from said cross rail to said trailing edge proximate to said second side edge; and a channel disposed between and separating said cross rails of said L-shaped rail and said U-shaped rail at said leading edge.

2. The air bearing slider of claim 1, wherein said cross rails of said U-shaped and L-shaped rails extend along said first and second portions of said leading edge, respectively.

3. The air bearing slider of claim 2, wherein said cross rails of said U-shaped and L-shaped rails each include a compression feature at said leading edge.

4. The air bearing slider of claim 1, wherein said first leg rail of said U-shaped rail extends along said first side edge.

5. The air bearing slider of claim 1, wherein said leg rail of said L-shaped rail extends along said second side edge.

6. The air bearing slider of claim 1, wherein said first leg rail of said U-shaped rail has a length less than 97% of the slider body length and greater than 30% of the slider body length.

7. The air bearing slider of claim 1, wherein at least one of said first leg rail of said U-shaped rail and said leg rail of said L-shaped rail narrows in the direction of said trailing edge.

8. The air bearing slider of claim 1, wherein at least one of said first leg rail of said U-shaped rail and said leg rail of said L-shaped rail widens in the direction of said trailing edge.

9. The air bearing slider of claim 1, wherein said leg rail of said L-shaped rail has a transverse channel.

10. The air bearing slider of claim 9, wherein said first leg rail includes a termination edge at said recessed area of reduced load bearing capability, and wherein said transverse channel includes a leading edge coincident with said termination edge.

11. An air bearing slider for supporting a transducer, comprising:
- a slider body having a leading edge, a trailing edge, first and second side edges, and an air bearing surface;
- a U-shaped rail on said air bearing surface defining a negative pressure pocket, said U-shaped rail consisting of a cross rail extending proximate to a first portion of said leading edge, a first leg rail extending from said cross rail to said trailing edge proximate to said first side edge, and a second leg rail extending from said cross rail in the direction of said trailing edge;
- an L-shaped rail on said air bearing surface consisting of a cross rail extending proximate to a second portion of said leading edge, and a leg rail extending from said cross rail in the direction of said trailing edge proximate to said second side edge, said leg rail having a recessed area of reduced load bearing capability at said trailing edge; and
- a channel disposed between and separating said cross rails of said L-shaped rail and said U-shaped rail at said leading edge.

12. The air bearing slider of claim 11, wherein said cross rails of said U-shaped and L-shaped rails extend along said first and second portions of said leading edge, respectively.

13. The air bearing slider of claim 12, wherein said cross rails of said U-shaped and L-shaped rails each have a compression feature at said leading edge.

14. The air bearing slider of claim 11, wherein said first leg rail of said U-shaped rail extends along said first side edge.

15. The air bearing slider of claim 11, wherein said leg rail of said L-shaped rail extends along said second side edge.

16. The air bearing slider of claim 11, wherein said leg rail of said L-shaped rail has a length less than 97% of the slider body length and greater than 30% of the slider body length.

17. The air bearing slider of claim 11, wherein at least one of said first leg rail of said U-shaped rail and said leg rail of said L-shaped rail narrows in the direction of said trailing edge.

18. The air bearing slider of claim 11, wherein at least one of said first leg rail of said U-shaped rail and said leg rail of said L-shaped rail widens in the direction of said trailing edge.

19. The air bearing slider of claim 11, said first leg rail of said U-shaped rail has a transverse channel.

20. The air bearing slider of claim 19, wherein said leg rail includes a termination edge at said recessed area of reduced load bearing capability, and wherein said transverse channel includes a leading edge coincident with said termination edge.

21. A data storage device comprising:
- a rotatable storage medium;
- a transducer positionable with respect to the storage medium for writing and reading information on the medium; and
- a slider for supporting the transducer in close proximity to the storage medium, the slider comprising,
  - a slider body having a leading edge, a trailing edge, first and second side edges, and an air bearing surface,
  - a U-shaped rail on said air bearing surface defining a negative pressure pocket, said U-shaped rail consisting of a cross rail extending proximate to a first portion of said leading edge, and first and second leg rails extending from said cross rail in the direction of said trailing edge, said first leg rail being disposed proximate to said first side edge and having a recessed area of reduced load bearing capability at said trailing edge, and
  - an L-shaped rail on said air bearing surface consisting of a cross rail extending proximate to a second portion of said leading edge, and a leg rail extending from said cross rail to said trailing edge proximate to said second side edge, and
  - a channel disposed between and separating said cross rails of said L-shaped rail and said U-shaped rail at said leading edge.

22. A data storage device comprising:
- a rotatable storage medium;
- a transducer positionable with respect to the storage medium for writing and reading information on the medium; and
- a slider for supporting the transducer in close proximity to the storage medium, the slider comprising,
  - a slider body having a leading edge, a trailing edge, first and second side edges, and an air bearing surface,
  - a U-shaped rail on said air bearing surface defining a negative pressure pocket, said U-shaped rail consisting of a cross rail extending proximate to a first portion of said leading edge, a first leg rail extending from said cross rail to said trailing edge proximate to said first side edge, and a second leg rail extending from said cross rail in the direction of said trailing edge,
  - an L-shaped rail on said air bearing surface consisting of a cross rail extending proximate to a second portion of said leading edge, and a leg rail extending from said cross rail in the direction of said trailing edge proximate to said second side edge, said leg rail having a recessed area of reduced load bearing capability at said trailing edge, and
  - a channel disposed between and separating said cross rails of said L-shaped rail and said U-shaped rail at said leading edge.

* * * * *